United States Patent [19]
Darilek

[11] Patent Number: 4,695,840
[45] Date of Patent: Sep. 22, 1987

[54] REMOTE SWITCH POSITION DETERMINATION USING DUTY CYCLE MODULATION

[75] Inventor: Glenn T. Darilek, San Antonio, Tex.
[73] Assignee: Mobil Oil Corporation, New York, N.Y.

[21] Appl. No.: 771,966
[22] Filed: Sep. 3, 1985
[51] Int. Cl.[4] ........................ H04Q 9/00; G08C 19/00
[52] U.S. Cl. ........................ 340/825.054; 340/825.63; 340/825.77; 340/310 A; 340/870.38
[58] Field of Search ...................... 340/825.36, 825.37, 340/870.24, 870.25, 870.38, 870.37, 825.54, 825.78, 510, 825.16, 510 A, 825.63, 825.77

[56] References Cited

U.S. PATENT DOCUMENTS

| | | | |
|---|---|---|---|
| 3,309,521 | 3/1967 | Bargainer, Jr. | 250/262 |
| 3,394,364 | 7/1968 | Bruce et al. | 340/870 |
| 3,427,580 | 2/1969 | Brock | 340/857 |
| 3,464,058 | 8/1969 | Gollwitzer | 340/857 |
| 3,550,090 | 12/1970 | Baker, Jr. et al. | 340/825.71 |
| 3,689,876 | 9/1972 | Kampfer | 340/856 |
| 3,796,993 | 3/1974 | Fox et al. | 340/870.38 |
| 3,922,490 | 11/1975 | Pettis | 340/870.38 |
| 3,991,611 | 11/1976 | Marshall, III et al. | 73/151 |
| 4,027,286 | 5/1977 | Marosko | 340/310 R |
| 4,035,763 | 7/1977 | Cowles | 340/856 |
| 4,103,337 | 7/1978 | Whitside | 364/900 |
| 4,107,644 | 8/1978 | Howlett | 340/857 |
| 4,136,327 | 1/1979 | Flanders et al. | 340/310 A |
| 4,178,579 | 12/1979 | McGibbeny et al. | 340/856 |
| 4,215,425 | 7/1980 | Waggener | 375/83 |
| 4,268,822 | 5/1981 | Olsen | 340/533 |
| 4,311,986 | 1/1982 | Yee | 340/825.54 |
| 4,398,178 | 8/1983 | Russ et al. | 340/310 A |
| 4,413,250 | 11/1983 | Porter et al. | 340/825.63 |
| 4,459,760 | 7/1984 | Watson et al. | 33/312 |
| 4,463,352 | 7/1984 | Forbes | 340/825.36 |
| 4,580,138 | 4/1986 | Morrison | 340/870.38 |

*Primary Examiner*—Donald J. Yusko
*Attorney, Agent, or Firm*—Alexander J. McKillop; Michael G. Gilman; Charles J. Speciale

[57] ABSTRACT

A system for determining the position of a plurality of remotely located switches having a binary weighted current controlling means connected to each switch for providing a waveform having a unique duty cycle corresponding to the position of each of the switches. The duty cycle is decoded at a local test station to provide digital output data indicative of the position of each of the switches. The duty cycle encoder includes a switching means connected across a two conductor line that terminates the cycle of an input waveform generated by a source generator at said local test station. The current controlling means controls the output of a constant current source which depends upon the number of switches that are open and closed. A timing means is responsive to the output of said constant current source for triggering the switching means. The resultant waveform at the local test station has a duty cycle that is decoded to indicate the position of the remote switches.

34 Claims, 6 Drawing Figures

FIG. I

REMOTE SWITCH POSITION DETERMINATION USING DUTY CYCLE MODULATION

BACKGROUND OF THE INVENTION

1. Field of the Invention

This invention relates to telemetering information from a remote location to a control station. More particularly, the invention relates to the monitoring at a local test station the position of switches located at the wellhead of a subsea petroleum well.

2. Description of the Prior Art

In the control and monitoring of processes or instrumentation, the position of several remote switches or contact closure must be monitored. For example, to a monitor the production of one type of subsea petroleum well, the position of four valves on the subsea wellhead structure must be monitored at an accessible test location, such as on the sea surface or subsea atmospheric control system. Usually there are two limit switches associated with each valve, one to indicate the fully opened position and another for the fully closed position. Monitoring the position of these eight limit switches normally would require nine conductors including one common conductor and one conductor for each switch. Cable connectors are then required to have the same number of contacts.

However, due to the subsea environment of high pressure and salt water and the requirement to install the connectors using divers, submersible vehicles or other means, it is desirable to minimize the number of conducors and connector contacts for reliability and connect installation reasons. In addition, due to connector or cable corrosion, the value of the circuit impedance can change with time or from one installation to the next.

Thus, it is desirable to utilize only a single pair of electrical conductors between the subsea location and the test location. Furthermore, the use of alternating current electrical signals for monitoring is highly desirable to minimize electrolysis and subsequent corrosion of the conductors or connectors. Also, for long term reliability reasons, it is not desirable to use a source of power at the wellhead structure. It is likewise desirable to minimize circuit complexity for reliability reasons.

One prior art system for monitoring the status of control valves and switches utilizes passive resonant circuitry such as that disclosed in U.S. Pat. Nos. 3,550,090 issued to Baker, Jr., et al., 4,027,286 issued to Marosko and 4,268,822 issued to Olsen. In these systems, frequency selective resonant circuits are placed near the individual switches. The resonant circuits are connected or disconnected or the resonant requencies are changed by the closure of the switches. Decoding circuitry responsive to the change in resonance of the switch circuits provides the status of the switches. The coding and decoding circuitry is very complex. In addition, in the U.S. Pat. 4,027,286 system, the bandwidth of the conductive couper limits the channel capacity so that the status of only six switches can be determined.

Another prior art telemetry system is disclosed in U.S. Pat. 4,136,327 issued to Flanders, et al., wherein a two conductor line serves a dual purpose of supplying power into the borehole and communicating sensor data back up to surface. In the Flanders, et al. system, phase modulation is used to transmit a binary encoded signal to the surface that is received by a digital computer. In this type of system, the remote system electronics is complex, which may degrade reliability in a subsea environment.

U.S. Pat. 4,178,579 issued to Gibbens, et al. teaches the remote sensing of flow valves by using variable detection and a constant current source. The resistance of the entire sensing circuit is measured in a reference mode by passing a constant current through the circuit. The constant current is reversed by means of diodes, so that the current passes through the circuit containing the variable resistor. The difference in resistance from the reference mode is measured to determine the magnitude of the parameter of interest.

U.S. Pat. 4,103,337 issued to Whiteside discloses a data transmission system wherein a digital processor generates a date request signal across a two wire transmission line to a remote sensor. Sensor interface circuitry includes an analog to pulse width converter and a decoder which generates a pulse width signal in response to the data signal indicative of the value of the analog signal generated by the sensor. A pulse width to digital converter converts the data signal to digital form which is terminated in response to the pulse width signal from the sensor interface. The signal stored in the pulse width to digital converter is transmitted to the digital processor to indicate the value of the parameter being sensed.

SUMMARY OF THE INVENTION

The system of the present invention utilizes duty cycle modulaion to sense the position of a plurality of remotely located switches. The system includes a duty cycle encoder that controls the output duty cycle of a source wave generator. The remote duty cycle encoder modulates the source wave generator to provide a signal having a unique duty cycle corresponding to the position of the remote switches. The duty cycle is decoded at a local test station to indicate the status of each of the remote switches.

The encoding network includes a uniquely weighted current controlling means connected to each of the remote switches. The current controlling means control the output of a constant current source. The waveform generator located at the test station generates a signal across a two wire cable to the remote switches. A switching means is connected across the two wire line at the remote location for terminating the cycle of the generated waveform. A timing means triggers the switching means in response to the output of the constant current source. Thus, the duty cycle of the resultant terminated waveform is a unique indication of the status of each of the remote switches. The duty cycle of the waveform is then decoded and converted into digital data to indicate the position of each of the remote switches.

DETAILED DESCRIPTION OF THE INVENTION

Figure 1:
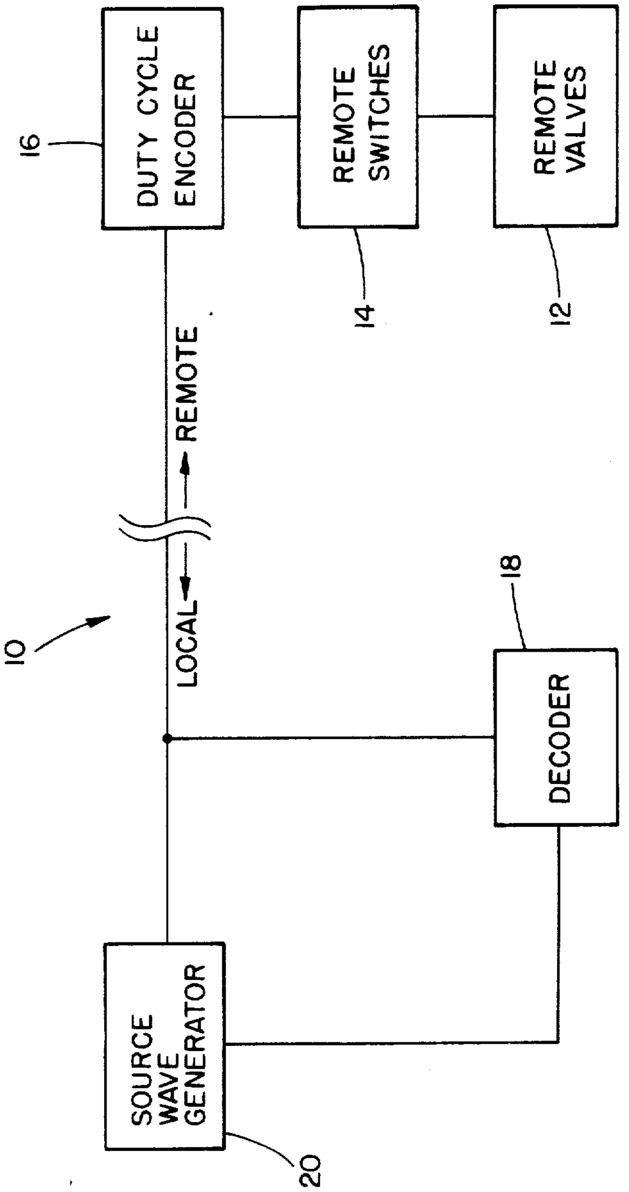
FIG. 1 is a block diagram of the system of the present invention.

The present invention provides the system 10 for determining the position of a plurality of remotely located switches. The following description is with respect to the monitoring of the production of a subsea petroleum well. However, the subsea petroleum well is only one example of a use for the present system and the invention should not be limited for use in a petroleum well system. To monitor the production of a subsea petroleum well, the position of valves on the subsea well head structure, shown in FIG. 1 at 12, must be monitored at an accessible test location such as the sea surface or at a subsea control chamber. Connected to the valves are a plurality of switches 14. Swiches 14 are position sensitive switches such as limit swiches and there are generally two switches associated with each valve, one to indicate the fully open position and the other to indicate the fully closed position.

A duty cycle encoder 16 is located at the subsea location and provides a signal having a unique duty cycle to indicate the position of the plurality of switches 14. At the local test location, a decoder 18 decodes the duty cycle to indicate the position of each of remote switches 14. A source wave generator 20 at the local station sends an input signal to the encoder 16 and switches 14. The input wave energizes the duty cycle encoder 16 which acts upon the input signal to provide a waveform at the local station having a duty cycle corresponding to thep position of the remote switches 14.

Figure 2:
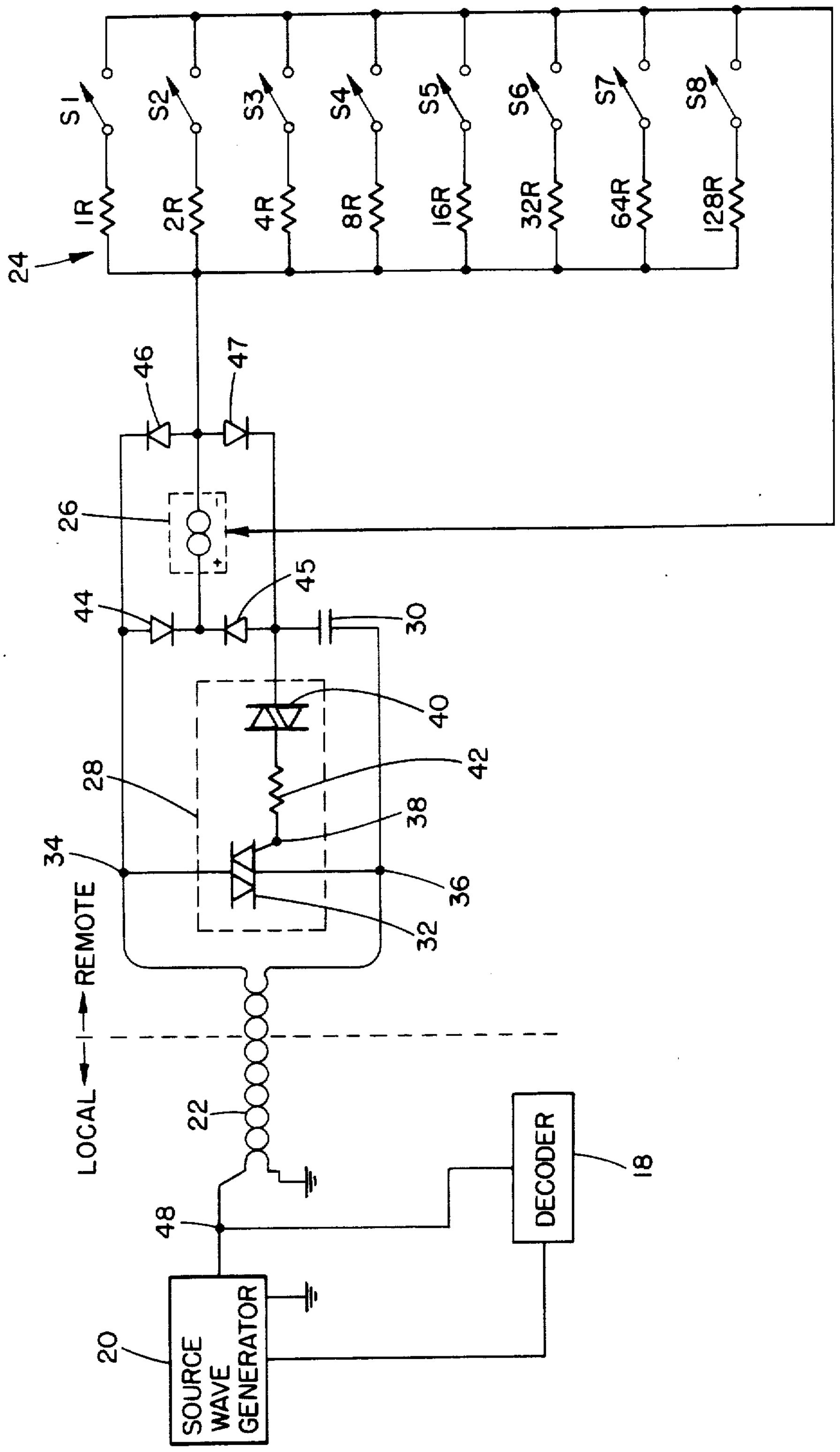
FIG. 2 is schematic diagram of the duty cycle encoding means.

The remote circuitry is shown in more detail in FIG. 2 wherein there are eight switches indicated by S1–S8. The use of eight switches is to monior the position of four valves. A two wire line 22 connects the local test station to the duty cycle encoder 16 at the remote wellhead location. The duty cycle encoder 16 includes a current controlling network 24, formed by connecting a uniquely weight current controlling means R in series with each of the remote switches. In the illustrative embodiment shown in FIG. 2, the current controlling means R are resistors. The resistors R are uniquely weighed to provide a unique current depending on which of the switches are closed. In the embodiment shown in FIG. 2 the resistors are binary weighted with the individual binary values being indicated above each resistor.

The resistors R control the output of a programmable constant current source 26 connected to the current controlling network 24. A switching means 28 is connected across the two wire line 22 for terminating the cycle of the waveform generated from the generator 20. A timing means 30 is connected between the constant current source 26 and the switching means 28 and triggers the switching means 28 in response to the output from the constant current source 26. In the embodiment shown in FIG. 2, the timing means 30 is a capacitor that is charged by the current source 26.

The switching means 28 includes a solid state bilateral switch such as a triac 32 having two main terminals connected across the two wire line 22 at nodes 34 and 36 and a gate 38. A trigger means 40, such as a diac, is connected to the gate 38 and initiates the turn on of the triac 32. A resistor 42 may be placed in series between the diac 40 and the gate 38 to limit the current flow to the triac gate 38. The diodes 44, 45, 46, 47 insure the proper direction of the current flow within the programmable constant current source 26.

The circuit shown in FIG. 2 is only one embodiment of the duty cycle encoder 16. Several other embodiments will be described hereinafter but will better understood if the operation of the embodiment in FIG. 2. is described. In operation, the source wave generater 20 initiates and alternating current square wave input across transmission line 22 to the duty cycle encoder 16. The current controlling network 24 controls the output of the constant current source 26. The value of the output will depend on the combination switches S1–S8 that are closed. The current source 26 charges the capacitor 30 to a sufficient amount to force the diac 40 into conduction which will trigger the triac 32 into an on state. The value of the output of the current source 26 will determine the length of time it will take the capacitor 30 to charge in order to trigger the triac 32. When the triac 32 turns on, the cycle of the input square wave will be terminated, and the duty cycle of the resultant waveform at node 48 will correspond to the status of the remote switches. The duty cycle of the waveform at node 48 is decoded by decoder 18 to produce an output corresponding to the positon of each of the remote switches. Thus, by using the simple duty cycle encoding circuitry of the present invention, an accurate determination can be made of the position of a number of remote switches. In the embodiment shown in FIG. 2, the duty cycle measurement resolution and accuracy must be better than one part in $2^8$ or 0.39% for proper decoding of these switches.

Figure 3:
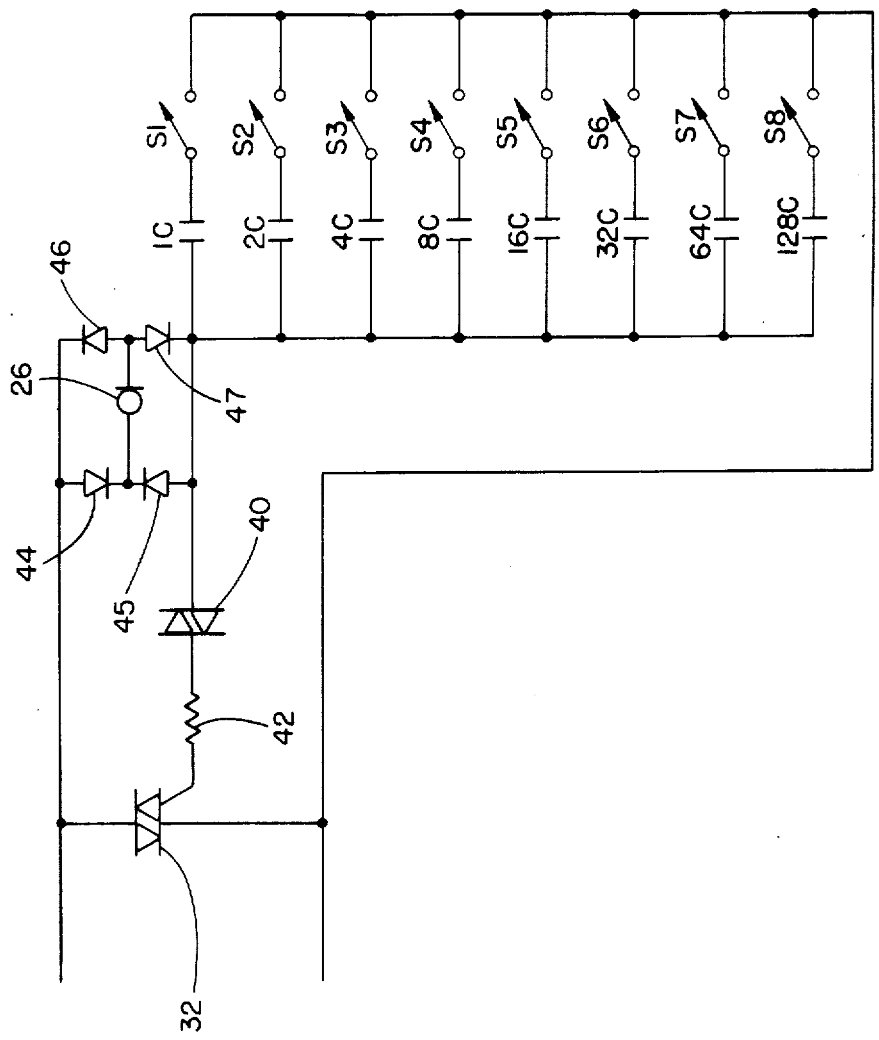
FIG. 3 is a schematic of an alternative embodiment of the duty cycle encoding means.

An alternate embodiment of the duty cycle encoder 16 is shown in FIG. 3 wherein the timing of the duty cycle is controlled by the connection of binary weighted capacitors connected in series with each remote switch S7-S8.

Figure 4:
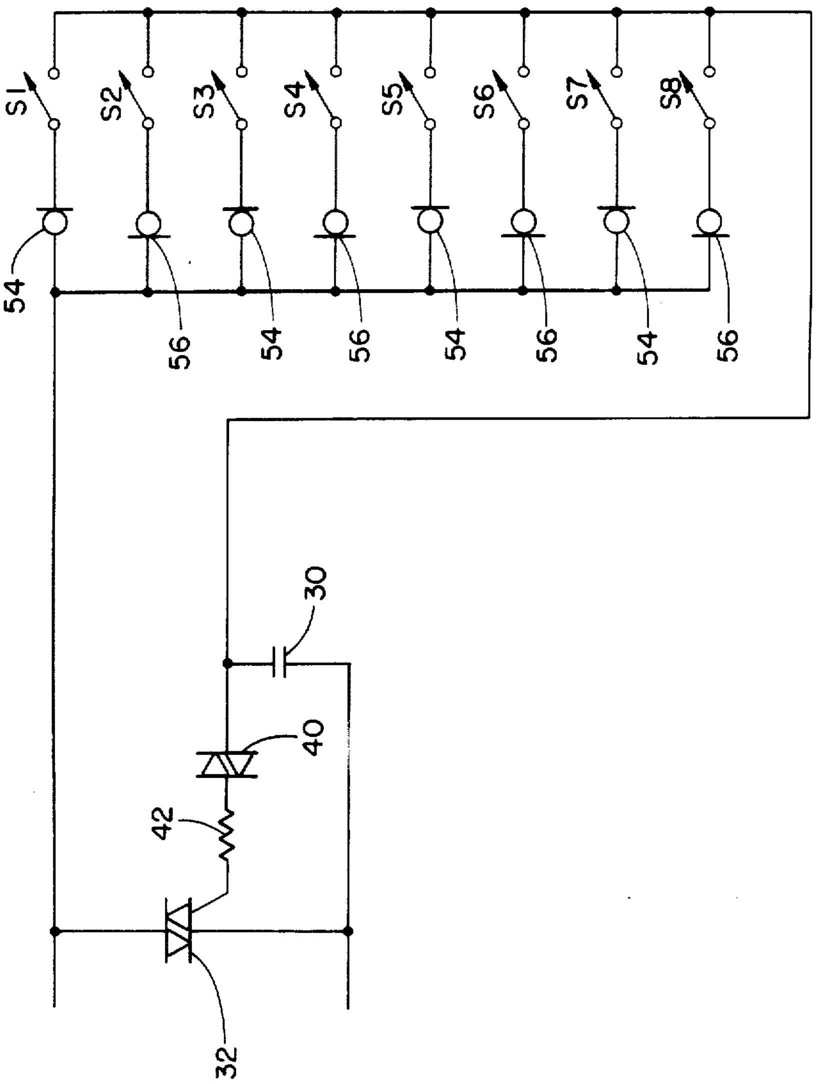
FIG. 4 is a schematic diagram of another embodiment of the duty cycle encoding means utilizing constant current diodes.

A further embodiment of the duty cycle encoder 16 is shown in FIG. 4 wherein the position of one half the switches is determined by measuring the duty cycle of the positive transition of the alternating current square wave input and the positon of the other half of the switches is determined by measuring the duty cycle of the negative transition of the square wave input. Constant current diodes 54 and 56 are placed in series with switches S1-S8 which permits the elimination of the programmable constant current source 26. The constant current diodes 54 and 56 may be any type of current regulator. Preferably, the current regulators are those disclosed in U.S. patent application Ser. No. 772,083, filed Sept. 3, 1985 entitled "Remote Switch Position Determination Using Constant Current Signaling" by the same inventor as the present invention, the entire application of which is incorporated herein by reference. Constant current diodes 54 and 56 will charge the capacitor 30 in order to trigger the triac 32. It should also be noted that although binary weighting is described herein the use of other than binary weighted component values can be used in the duty cycle encoding system. The required duty cycle measurement resolution accuracy in this embodiment is one part in $2^5$ or 3.1% for proper decoding of eight switches.

Figure 5:
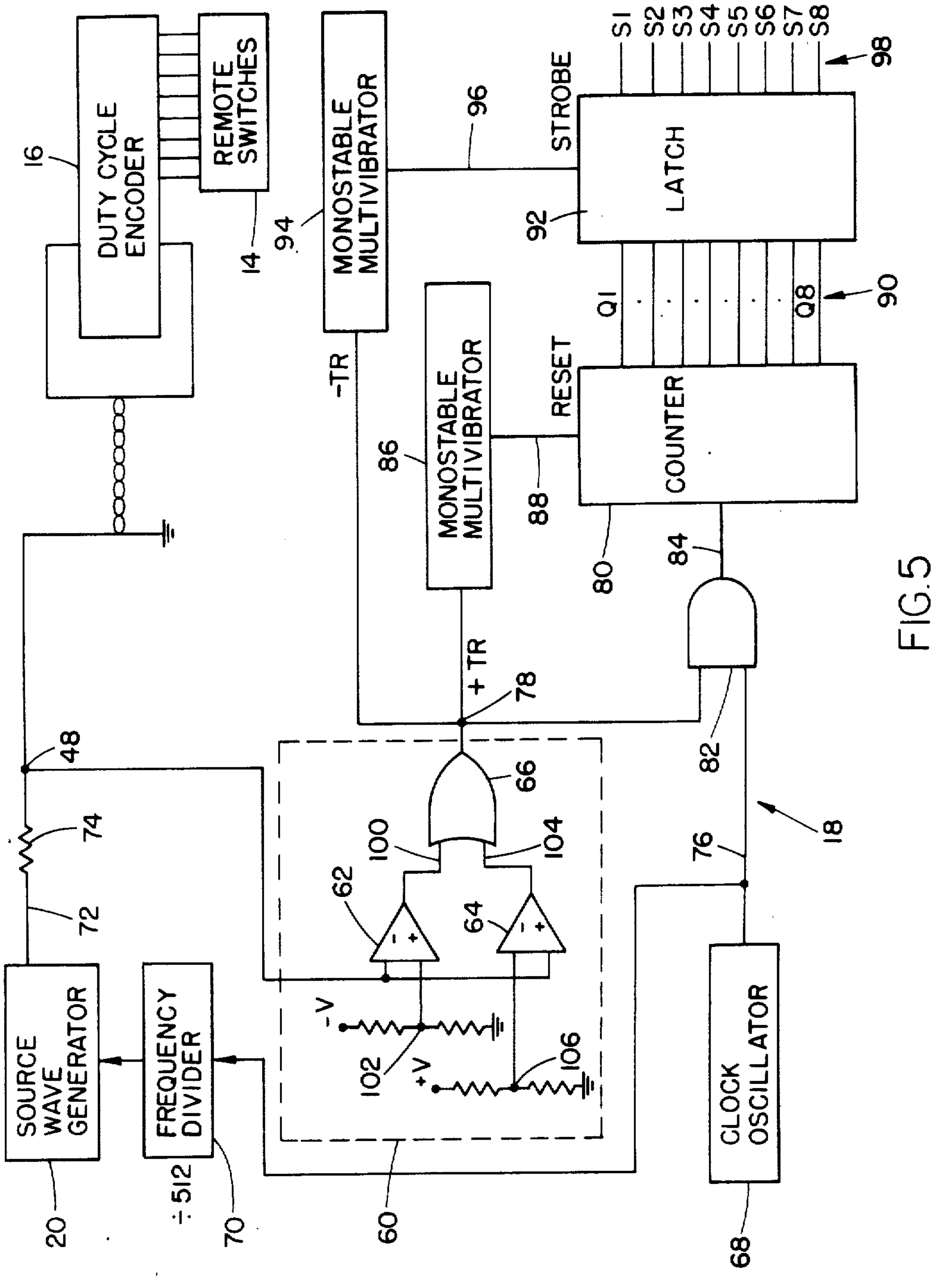
FIG. 5 is a block diagram showing the decoding means of the present invention.

FIG. 5 shows one embodiment of the duty cycle decoding circuit 18. A coverter means 60 converts the waveform from node 48 to a single polarity train of pulses. The converter means 60 consists of a pair of comparators 62 and 64 and an OR gate 66. A clock oscillator 68 provides a common time base to the source wave generator 20 and the decoder 18. A frequency divider 70 divides the frequeny of the clock oscillator by 512 and is connected to the source wave generator 20. The wave generator 20 is a power gain stage providing the excitation signal at 72. The series resistor 74 allows the signal at node 48 to be pulled to near zero by the duty cycle encoder 16.

The output of clock oscillator 68 at node 76 and the output of converter means 60 at node 78 are gated to the input of a counter 80 by AND gate 82 producing the signal at node 84. The counter 80 is reset to zero by a monostable multivibrator 86 which produces a narrow pulse at node 88 in a response to a positive going transition of the signal at node 78. The outputs of the counter at nodes 90 are connected to the inputs of a latch 92. A monostable multivibrator 94 generates a narrow pulse signal at node 96 in response to a negative going transition of the signal at node 78 in order to strobe the input states to the outputs of the latch 92. The timing elements for the monostable multivibrators 86 and 94 are selected to produce an output pulse of a duration slightly less than the half period of the output of the clock oscillator 68. The latch outputs at nodes 98 will correspond to the positons of the remote switches S1-S8.

Figure 6:
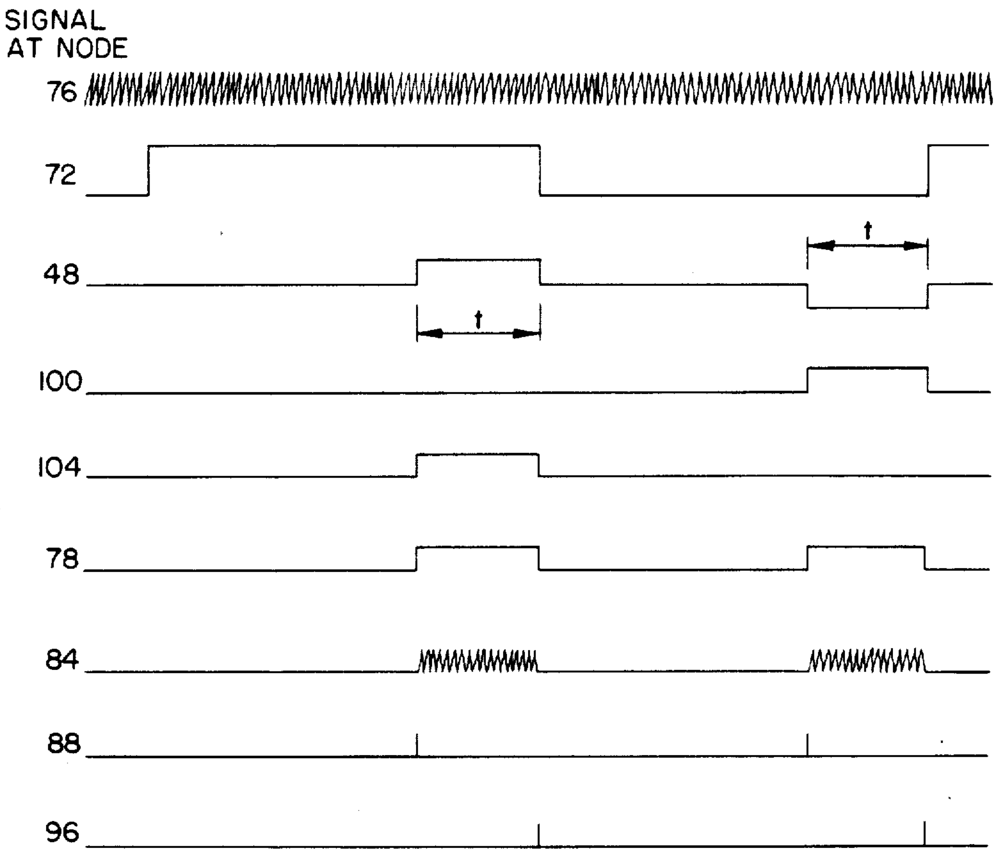
FIG. 6 is a graph of the waveforms at various locations in the circuit of FIG. 5.

In operation, the duty cycle decoder 18 produces outpus corresponding to the position of the remote switches by counting clock pulses from a time period deermined by the duty cycle of the waveform generated by the action of the duty cycle encoder 16 on the output of the source wave generator 20. As the circuit 18 is described, reference should be made to FIG. 6 showing the waveforms at the various nodes. The input square wave signal at 72 is acted upon by the duty cycle encoder 16 to produce the waveform at 48 having a duty cycle of time t as shown in FIG. 6. The output of the comparator 62 at node 100 is high whenever the signal at 48 is more negative than the slightly negative voltage at node 102. Correspondingly, the output of the comparator 64 at node 104 is high whenever the signal at 48 is more positive than the slightly positive voltage at node 106. The output of the OR gate 66 at node 78 is high whenever either the signal at 100 or 104 is high. Thus, as shown in FIG. 6, the alternating current signal at 48 is converted to a chain of pulses at a single polarity having a duty cycle of time t. At the positive going transition of the signal at 78 the counter 80 is reset to zero and the AND gate 82 will produce an output at node 84 for the duration of time t. The counter 80 counts the cycles of the clock oscillator 68 for the duration of time t.

The duration of time t is controlled by the posiion of the remote switches and is equal to the number of clock cycles determined by the binary weighted combination of the switches in the closed position. The time t can be found in relation to the number of clock cycles by the equation: $(S1\times 2^0)+(S2\times 2^1)+(S3\times 2^2)+(S4\times 2^3)+(S5\times 2^4)+(S6\times 2^5)+(S7\times 2^6)+(S8\times 2^7)$. For example, if only S1 and S4 were closed, the time t will be equal to: $(1\times 2^0)+(1\times 2^3)=(1)+(8)=9$ clock cycles. The switch status is updated once every half cycle of the source wave generator 20. The outputs of the counter 80 are inputed into the latch 92 and are held until the next strobe signal is generated at node 96. Thus, the latch outputs at nodes 98 correspond to the positions, of the remote switches S1-S8. It should be noted that the decoding circuit of FIG. 5 is one embodiment of a decoding means and other alternative circuits may be utilized with the present invention.

While illustrative embodiments of the subject invention have been described and illustrated it is obvious that various changes and modifications can be made therein without departing from the spirit of the present invention which should be limited only by the scope of the appended claims.

What is claimed is:

1. A system for determining the position of a plurality of remotely located switches at a local test station comprising:

means for generating a waveform having a predetermined duty cycle at said location test station across a two conductor line connecting said local test station to said remote switches;

uniquely weighted current controlling means connected to each switch for controlling the output of a constant current source connected to said current controlling means;

switching means connected across said two wire line at said remote location for terminating the duty cycle of said generated waveform;

timing means for triggering said switching means in response to the output of said constant current source thereby modulating the duty cycle of said generated waveform to provide a resultant waveform at said local test station having a duty cycle indicative of the position of said remote switches; and decoding means at said local test station responsive to said resultant waveform for deriving digital output data indicative of the position of each said remote switches.

2. The system of claim 1 wherein said uniquely weighted current controlling means are binary weighted resistors connected in series with each said remote switches.

3. The system of claim 1 wherein said uniquely weighted current controlling means are binary weighted capacitors connected in series with each of said remote switches.

4. The sysem of claim 1 wherein said uniquely weighted current controlling means are binary weighted constant current diodes.

5. The system of claim 1 further including a means for passing current to half of the remote switches during the positive leg of said alternating current waveform while blocking current to the other half of the switches, and correspondingly passing and blocking current to the opposite switches during the negative polarity of the alternating current waveform.

6. The system of claim 1 wherein said switching means includes a solid state bilateral switch.

7. The system of claim 6 wherein said switching means includes a trigger means for turning on said solid state bilateral switch.

8. The system of claim 7 wherein said solid state bilateral switch is a triac.

9. The system of claim 8 wherein said trigger means is a diac.

10. The sytem of claim 1 wherein said timing means is a capacitor.

11. The system of claim 1 wherein said decoding means includes a latching means for latcvhing the output of said counter. means includes a means for providing a common time base to said waveform generating means and said decoding means.

12. The system of claim 11 wherein said common time base includes a clock oscillator.

13. The system of claim 12 further including a frequency divider connected between said clock oscillator and said waveform generating means.

14. The system of claim 11 wherein said decoding means includes a converting means for converting said resultant waveform to a train of pulses at a single polarity, said pulses having the same duty cycle as said resultant waveform.

15. The system of claim 14 wherein said converting means includes a pair of comparators for converting said resultant waveform to two waveforms having pulses at the same polarity, and an OR gate connected to the outputs of the two comparators for providing a single waveform having a train of pulses at a single polarity.

16. The system of claim 15 wherein said decoding means includes a counter for counting the number of clock cycles for the duration of the duty cycle of the output of said convering means to provide an output indicative of the position of each said remote switch.

17. The system of claim 16 wherein said decoding includes a latching means for latching the outputs of said counter.

18. The system of claim 17 wherein said decoding means includes a first monosable multivibrator for resetting said counter and a second monostable multivibrator for strobing said latching means.

19. The system of claim 18 wherein said first and second monostable multivibrators are timed to produce an output pulse of duration slightly less than the half period of the output of said clock oscillator.

20. A system for sensing at a local test station the position of a plurality of valves on a wellhead located at a remote subsea locaion, each of said valves having a first switch to detect when the valve is closed and a second switch to detect when the valve is open, said system comprising:

- means for generating a waveform having a predetermined duty cycle at said local test station across a two conductor line connecting said local test station to said switches at said remote subsea location;
- switching means connected across said two conductor line for terminating the duty cycle of said generated waveform;
- timing means for triggering said switching means;
- a constant current source connected to said switching means and said timing means;
- current controlling means connected in series with each of said switches for controlling the output of said constant current source; and
- decoding means at said local test station for decoding the duty cycle of said terminated waveform;
- whereby said timing means triggers said switching means in response to the output of said constant current source modulating the duty cycle of said generated waveform thereby providing a resultant waveform at said local test station having a duty cycle that is decoded by said decoding means to indicate the position of said remote switches.

21. The system of claim 20 wherein said current controlling means are resistors.

22. The system of claim 20 wherein said current controlling means are capacitors.

23. The system of cliam 20 wherein said current controlling means are constant current diodes.

24. The system of claim 20, 21, 22 or 23 wherein said current controlling means for each said switch have a unique binary weighting.

25. A duty cycle encoding network for acting upon an input waveform to provide a resultant waveform having a unique duty cycle indicative of the position of a plurality of switches, said system comprising:

- a switching means for terminating the duty cycle of said input waveform;
- a timing means for triggering said switching means; a constant current source connected to said switching means and said timing means; and
- current controlling means connected in series with each of said switches for controlling the output of said constant current source;
- where said timing means triggers said switching means in response to the output of said constant current source modulaing the duty cycle of said input waveform thereby providing a resultant waveform having a duty cycle indicative of the position of said switches.

26. The system of claim 25 wherein said current controlling means are resistors.

27. The system of claim 25 wherein said current controlling means are capacitors.

28. The system of claim 25 wherein said current controlling means are constant current diodes.

29. The system of claims 25, 26, 27 or 28 wherein said current controlling means for each said switch have a unique binary weighting.

30. The system of claim 20 or 25 wherein said switching means includes a solid state bilateral switch.

31. The system of claim 30 wherein said switching means includes a trigger means for turning on said solid state bilateral switch.

32. The system of claim 31 wherein said solid state bilateral switch is a triac.

33. The system of claim 31 wherein said trigger means is a diac.

34. The system of claim 20 or 25 wherein said timing means is capacitor.

* * * * *

UNITED STATES PATENT AND TRADEMARK OFFICE
CERTIFICATE OF CORRECTION

PATENT NO. : 4,695,840

DATED : September 22, 1987

INVENTOR(S) : Glenn T. Darilek

It is certified that error appears in the above-identified patent and that said Letters Patent is hereby corrected as shown below:

Column 1, line 15, delete "a".
Column 1, line 32, "conducors" should be --conductors--.
Column 1, line 53, "requencies" should be --frequencies--.
Column 1, line 59, "couper" should be --coupler--.
Column 2, line 31, "modulaion" should be --modulation--.
Column 3, line 18, "Swiches" should be --Switches--.
Column 3, line 19, "swiches" should be --switches--.
Column 3, line 36, "monior" should be --monitor--.
Column 3, line 41, "weight" should be --weighted--.
Column 3, line 45, "weighed" should be --weighted--.
Column 4, line 5, insert --be-- before "better".
Column 4, line 8, "and" should be --an--.
Column 4, line 63, "coverter" should be --converter--.
Column 5, line 1, "frequeny" should be --frequency--.
Column 5, line 25, "outpus" should be --outputs--.
Column 5, line 27, "deermined" should be --determined--.
Column 5, line 50, "posiion" should be --position--.
Column 6, line 30, Claim 1, insert --of-- after "each".
Column 6, line 35, Claim 2, insert --of-- after "each".
Column 6, lines 63-64, Claim 11, delete "latching means for latcvhing the output of said counter means includes a".
Column 7, line 19, Claim 16, "convering" should be --converting--.
Column 7, line 22, Claim 17, insert --means-- before "including".
Column 7, line 25, Claim 18, "monosable" should be --monastable--.
Column 8, line 10, Claim 23, "cliam" should be --claim--.
Column 8, line 12, Claim 24, "claim" should be --claims--.
Column 8, line 21, Claim 25, delete second "a".

UNITED STATES PATENT AND TRADEMARK OFFICE
CERTIFICATE OF CORRECTION

PATENT NO. : 4,695,840

DATED : September 22, 1987

INVENTOR(S) : Glenn T. Darilek

It is certified that error appears in the above-identified patent and that said Letters Patent is hereby corrected as shown below:

Column 8, line 22, Claim 25, add --a-- before "constant".

Column 8, line 29, Claim 25, "modulaing" should be --modulating--.

Signed and Sealed this

Fourteenth Day of June, 1988

*Attest:*

DONALD J. QUIGG

*Attesting Officer*

*Commissioner of Patents and Trademarks*